United States Patent Office 2,796,913
Patented June 25, 1957

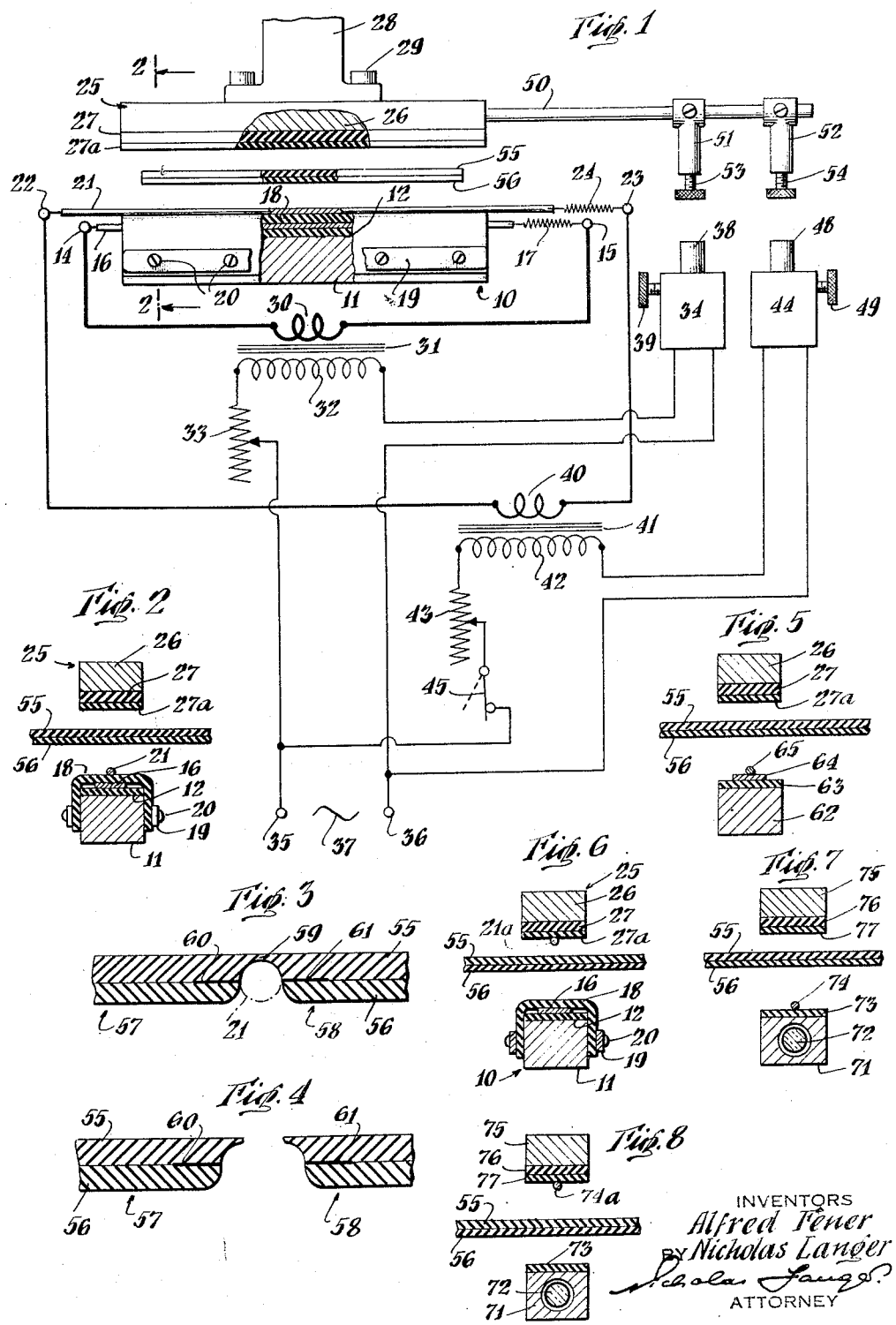

2,796,913

ART OF HEAT SEALING AND SEVERING THERMOPLASTIC FILMS

Alfred Fener, Brooklyn, and Nicholas Langer, New York, N. Y.; said Fener assignor to said Langer Application October 4, 1954, Serial No. 459,982

13 Claims. (Cl. 154—42)

This invention relates to the art of heat sealing layers of thermoplastic film and, more particularly, to a novel apparatus and method for heat sealing such layers and severing sealed portions of such layers from each other in a single operation.

It has been already suggested to employ an electrically heated wire as a combination heat sealing and severing member. This wire was tensioned above and spaced from a suitable base and was continuously heated by the passage of an electric current therethrough. When layers of thermoplastic film under some tension were brought into contact with the heated wire, the wire would cut or burn through the thickness of the tensioned layers and at the same time would heat seal the edges of the cut off layers together. However, as the seal obtained in this manner did not extend inwardly to any appreciable extent, it was relatively weak and unreliable and apparatus based on this principle was not commercially acceptable. Although various other suggestions were also made to solve the outstanding problem, none of these suggestions and proposals was completely satisfactory or successful on a practical and industrial scale.

It has been discovered that the problem may be solved in a remarkably simple manner.

It is an object of the present invention to improve heat sealing machines, particularly heat sealing machines of the thermal impulse type.

It is another object of the present invention to provide a novel and improved apparatus for heat sealing layers of a novel and improved apparatus for heat sealing layers of thermoplastic film and for cutting through the heat sealed region of the layers in a single operation.

It is a further object of the invention to provide a heat sealing machine of the thermal impulse type capable of forming heat sealed regions of appreciable width in thermoplastic layers and simultaneously bisecting such regions so that each severed portion is firmly and positively sealed together.

It is also within the contemplation of the invention to provide a combination heat sealing and severing machine which is simple in construction, reliable in its operation, and which may be readily manufactured and sold on a practical and commercial scale at a low cost.

The invention also contemplates a novel method of operating on layers of thermoplastic film whereby such layers are heat sealed in a region of appreciable width and such region is substantially simultaneously severed into two portions, each of which is strongly and positively sealed together.

Other and further objects and advantages of the invention will become apparent from the following description, taken in conjunction with the accompanying drawing, in which:

Fig. 1 is a side elevational view, somewhat diagrammatic and fragmentary in character and having parts in section, of a heat sealing and severing machine embodying the principles of the present invention;

Fig. 2 is a section taken on line 2—2 of Fig. 1;

Fig. 3 is a longitudinal sectional view, greatly enlarged for reasons of clarity, of a pair of thermoplastic layers operated upon by the apparatus of the invention;

Fig. 4 is a similar view of the heat sealed layers shown in Fig. 3, after having been completely separated into two portions;

Fig. 5 is a vertical sectional view, similar to Fig. 2, of a modified embodiment of the present invention;

Fig. 6 is a vertical sectional view, similar to Figs. 2 and 5, of another modified embodiment of the invention;

Fig. 7 is a vertical sectional view of a further modified embodiment of the invention into a heat sealing machine having a continuously heated sealing bar; and Fig. 8 is a view similar to Fig. 7 of still another modified embodiment of the invention into a heat sealing machine having a continuously heated sealing bar, with a cutting wire mounted on the pressure bar.

Broadly stated, in accordance with the principles of the invention, there is provided a sealing bar and a pressure bar, and reciprocating means for said bars for applying pressure upon a pair of layers of thermoplastic film interposed therebetween. The sealing bar may be of the continuously heated type or of the thermal impulse type and is adapted, when operated, to form a sealed region of appreciable width in the layers. There is further provided an elongated cutting or severing element, such as a cutting wire, which may be tensioned on either the sealing bar or on the pressure bar and is so arranged that in the pressure-applying position of the bars it is directly above the sealed region produced by the sealing bar. During operation of the machine, the wire will cut through the sealed region and bisect the same, thus separating the layers into two portions, each of which is heat sealed together in a region of appreciable width. The cutting wire may be heated by an electric current passed therethrough, either continuously or intermittently, or may be unheated, in which case the severing effect is purely mechanical and is due to the pressure exerted by the wire upon the sealed region while such region is still plastic.

The principles of the invention provide particularly advantageous results when they are applied to heat sealing machines of the thermal impulse type. In that case, there is tensioned on a suitable base a heater element or sealing band through which sealing pulses of current may be passed. This element is preferably formed of a metal or alloy having high electrical resistivity, such as a nickel-chromium alloy sold under the name "Nichrome." The heater element is covered by a thin layer of heat resistant insulation, a thin fabric woven from glass fibers (Fiberglas) impregnated or coated with tetrafluoroethylene (Teflon) being very satisfactory for the purpose. On this layer of insulation, there is tensioned directly above the sealing band, an elongated cutting or severing element, preferably in the form of a wire, which may be formed of the same material as the sealing band. The cutting wire has desirably a considerably smaller diameter than the width of the sealing band and is mounted in such position as to have its longitudinal axis directly above the longitudinal center line of the said band.

The elements so far described, in combination, constitute a sealing bar which is mounted for relative reciprocation with respect to a pressure bar. In the operation of the machine the superposed layers of thermoplastic film are introduced between the said bars and pressure is applied thereon. A pulse of electric current is passed through the sealing band and through the cutting wire, heating them practically instantaneously to a relatively high temperature. As a result of the heating effect of the sealing band, the layers will be heat sealed together in a region of appreciable width, generally corresponding to the width of the sealing band. At the same time, the heated cutting wire will be pressed against the sealed region and will separate or bisect it into two portions, each of which is strongly and reliably heat sealed. In accordance with the well known principles of impulse sealing, as disclosed and claimed in Langer Patent 2,460,460, pressure is maintained upon the sealed region for a short period after the pulses of electric current have been discontinued, in order to allow the sealed region or its bisected portions, to cool and to consolidate under pressure whereby the full strength of the seal is developed prior to separating the bars and withdrawing the sealed layers from the apparatus. For best results, it is desirable to adjust the intensity, duration and timing of the current pulses passed through the sealing band and through the cutting wire independently from each other.

It has been found that in most cases it is not absolutely necessary to heat the cutting wire by the passage of current pulses therethrough and that a perfectly satisfactory cut-off seal may be obtained by the mechanical effect of a relatively cold cutting wire upon the sealed region while the said region is still plastic. This modification of the invention provides certain advantages in that, in the absence of an energizing circuit for the cutting wire, the structure of the apparatus is considerably simplified. According to a further modification of the invention, the cutting wire is tensioned directly above the sealing band, in the absence of an insulating layer therebetween. In this case the cutting wire is electrically energized and heated concurrently with the sealing band, which likewise results in considerable simplification of the structure.

It has been further found that further advantages are obtained in heat sealing machines of the described character by mounting the cutting wire on the pressure bar, rather than on the sealing bar. In this case, the sealing heat and the cutting or severing pressure are applied to the thermoplastic layers from opposite directions. This results in more reliable operation and also provides certain additional advantages which will appear more fully from the detailed description of this form of the invention.

Referring now more particularly to Figs. 1 and 2 of the drawing, reference numeral 10 generally denotes a sealing bar comprising a base 11 of high heat conductivity metal, such as brass or aluminum, having a thin layer 12 of heat resistant insulation thereon. Upon this layer of insulation, there is tensioned between terminals 14 and 15 a heater element or sealing band 16 of Nichrome by interposition of a spring 17. The sealing band is covered by a thin layer of heat resistant insulation 18, the longitudinal marginal portions of which are folded over the sides of base 11 and are secured thereto by means of mounting plates 19 and screws 20. Insulating layer 18 is preferably formed of a Fiberglas fabric impregnated with Teflon in order to provide a sealing face to which the sealed thermoplastic layers will not adhere or stick.

On insulating layer 18, there is tensioned a cutting wire 21 of Nichrome between terminals 22 and 23, by the interposition of a spring 24. This wire has a diameter which is considerably less than the width of sealing band 16 and is desirably arranged with its longitudinal axis directly above the longitudinal center line of the sealing band.

Sealing bar 10 is mounted for cooperation with a pressure bar 25 comprising a metal base 26 having a layer 27 of a suitable elastomer, such as silicon rubber thereon. Preferably, a thin layer 27–a of heat-resistant insulation, such as Teflon-impregnated Fiberglas fabric, is cemented or other secured to elastic layer 27 and constitutes the pressure-applying face of bar 25 in order to improve the resistance of such face to mechanical deformation and also to reduce sticking of the sealed layers thereto. Pressure bar 25 is arranged for relative reciprocation with respect to sealing bar 10, means for carrying out such reciprocation being diagrammatically indicated by a support 28, secured to base 26 of the pressure bar by means of screws 29.

Terminals 14 and 15 of the sealing band are electrically connected with the respective ends of secondary winding 30 of a step-down transformer 31. The ends of primary winding 32 of the said transformer are respectively connected through a rheostat 33 and time-delay switch 34 to terminals 35 and 36 of a source of alternating current 37. Time delay switch 34 is of the type which is capable of closing an electric circuit upon its actuating plunger 38 being depressed and to automatically open such circuit a predetermined time delay period thereafter, the length of such time delay period being adjustable by means of adjusting screw 39. As time delay switches of this type are well known to those skilled in the art and do not form part of the present invention, no detailed description of their structure and operation is believed to be necessary.

Terminals 22 and 23 of cutting wire 21 are respectively connected to the ends of secondary winding 40 of a step-down transformer 41. The ends of primary winding 42 of said transformer are respectively connected through rheostat 43 and on-off switch 45 to terminal 35 and through time delay switch 44 to terminal 36 of alternating current source 37. Time delay switch 44 is provided with an actuating plunger 48 and an adjusting screw 49 for adjusting the time delay period.

Pressure bar 25 has a horizontally extending rod 50 mounted thereon from which depend actuating rods 51 and 52 in the lower end of which are threaded screws 53 and 54, respectively. Screws 53 and 54 are so arranged that during downward displacement of the pressure bar, they will strike against actuating plungers 38 and 48 of time delay switches 34 and 44, thereby initiating the operation of the sealing and cutting cycles. The moment in which said cycles begin is individually adjustable by means of screws 53 and 54 which adjust the effective lengths of actuating rods 51 and 52, respectively.

From the foregoing description, the operation of the machine of the invention will be readily understood by those skilled in the art. When it is desired to operate the machine, layers 55 and 56 of thermoplastic films are introduced between the sealing and pressure bars and the reciprocating means are actuated. During downward displacement of pressure bar 25, screw 53 at the end of actuating rod 51 will strike against actuating plunger 38 of time delay switch 34, thereby completing the primary circuit of transformer 31. Sealing band 16 will be energized and will be practically instantaneously heated to heat sealing temperature, thereby causing heat sealing of the layers in a region of appreciable width. A short period thereafter, time delay switch 34 will automatically break the primary circuit of transformer 31, deenergizing the sealing band so that the seal formed may cool and consolidate under pressure.

Practically simultaneously with the foregoing procedure, screw 54 at the end of actuating rod 52 will strike against actuating plunger 48 of time delay switch 44, thereby completing the primary circuit of transformer 41, through rheostat 43 and closed switch 45. Cutting wire 21 will be energized and heated and by a combination of thermal and mechanical effects will cut through the center line of the sealed region. A short period thereafter, time delay switch 44 will open the primary circuit of transformer 41 and the cutting wire will be deenergized. Finally, allowing sufficient time for the sealed and severed layers to cool and to consolidate, the bars are separated and the finished product is withdrawn.

It will be noted that the intensity of the current pulses passed through the sealing band and the cutting wire may be individually adjusted by rheostats 33 and 43, respectively. The time upon which the two heating cycles are initiated may be individually adjusted by set screws 53 and 54, and the length of such cycles may be individually determined by adjustment of screws 39 and 49 of the time delay switches. Thus, the machine may be readily adjusted for optimum results to operate upon thermoplastic layers of various type and gauge and to produce cut-off seals of various character. In the event that it is not desired to heat the cutting wire, switch 45 is opened, which will deenergize the circuit of the wire. In this case the wire is unheated or is merely moderately heated by heat transmitted thereto from the sealing band through the thickness of insulating layer 18, and its cutting effect is largely mechanical as a result of the pressure exerted thereby upon the sealed region while such region is still in the plastic state.

Considerable variations are possible as to the dimensions of the sealing band and of the cutting wire in accordance with the particular application. In most cases, however, the sealing band will have a width between $\frac{1}{16}''$ and $\frac{1}{4}''$ and its thickness will be between 0.001'' and 0.01''. The cutting wire may have a diameter between 0.015'' and 0.040''. Preferably, both elements are formed of Nichrome. Insulating layers 12 and 18 may be formed of Teflon-impregnated Fiberglas fabric having a thickness between 0.003'' and 0.010''. Obviously, the length of the sealing band and of the cutting wire is determined by the length of the desired seal.

Fig. 3 is a greatly enlarged section through a pair of themoplastic layers sealed and cut by the apparatus and method of the invention. It will be noted that layers 55 and 56 have been substantialy severed into two portions 57 and 58 by the extruding effect of cutting wire 21, the said portions being temporarily connected by a thin bridging piece 59. Each of the said portions is heat sealed together for an appreciable distance inwardly from the cut region, as indicated at 60 and 61. This assures a strong and positive seal of each severed portion of the layers. In most cases, the two substantially severed portions of the sealed layers will be completely separated from each other upon their removal from the sealing bar, as this is shown in Fig. 4. However, by proper adjustment of the operating conditions of the machine, it can be readily obtained that the two sealed portions of the layers are completely severed from each other already prior to their removal from the sealing bar, or are only scored to a greater or lesser depth, as desired.

Fig. 5 illustrates a modified embodiment of the invention in which the sealing band and the cutting wire are in direct electrical and mechanical contact with each other. The sealing bar comprises a metal base 62 having a layer of heat-resistant insulation 63 thereon. On this insulating layer there is tensioned a sealing band 64 and directly superimposed on said band is tensioned cutting wire 65 which is symmetrically arranged with respect to the band. Since the sealing band and the cutting wire are in direct electrical contact with each other they are energized concurrently. This results in a somewhat simpler structure, although, of course, individual adjustment of the pulses of electric current passed through the sealing band and through the cutting wire, respectively, is not possible.

Fig. 6 illustrates a further modified embodiment of the invention in which the cutting wire is tensioned on the operating or pressure-applying face of the pressure bar, rather than on the sealing bar. In other respects, this embodiment is closely similar to the one shown in Fig. 2 and similar reference numerals have been used to denote corresponding parts. Reference numeral 10 generally denotes the sealing bar, comprising a base 11 of metal having a layer 12 of heat-resistant insulation, such as Teflon-impregnated Fiberglas fabric, thereon. A sealing band 16 of Nichrome is tensioned on insulating layer 12 and is covered by another layer 18 of similar insulation, the longitudinal marginal portions of which are folded over the lateral surfaces of bar 11 and are secured thereto by means of metal plates 19 and screws 20.

Pressure bar 25 comprises a metal base 26 having a layer 27 of a suitable elastomer, such as silicone rubber, thereon, which is covered by a thin layer 27-a of Teflon-impregnated Fiberglas fabric. On layer 27-a is tensioned cutting wire 21-a of Nichrome in such a position that its longitudinal axis is directly above the longitudinal center line of sealing band 16. The object of the provision of layer 27-a is threefold. As a result of its superior tensile strength, it prevents excessive deformation of elastic layer 27 and embedding of the cutting wire in such elastic layer under pressure-applying conditions. Also, being of a heat-resistant character, it protects elastic layer 27 from excessive heat that may be produced in the cutting wire, in case it is desired to electrically energize such wire. Furthermore, due to the surface characteristics of the Teflon-impregnation, it prevents adherence or sticking of the sealed layers to the pressure bar.

The operating mechanism and electrical control circuits associated with this modified embodiment of the invention may be identical with the one disclosed in connection with Fig. 1 and cutting wire 21-a may be electrically energized or may be unheated and acting principally by its mechanical effect, as desired.

The practical advantages provided by this modified embodiment of the invention are largely due to the fact that the sealing heat and the cutting pressure are applied from opposite directions to the thermoplastic layers which are being operated on. This results in faster and more reliable operation of the machine. Also, as during the pressure-applying operation, the cutting wire on the pressure bar is separated from the heat resistant layer 18 of the sealing bar by the thickness of the thermoplastic layers; any abrasion or cutting of layer 18 by the cutting wire 21-a is substantially completely eliminated. Therefore, the machine shown in Fig 6, requires less frequent replacement of insulating layer 18 and, in general, less servicing than the machine of Fig. 2, in which the cutting wire 21 directly overlies insulating layer 18 and where some abrasive effect of such wire on said layer is unavoidable.

Figs. 7 and 8 illustrate modifications in which the principles of the invention are applied to heat sealers of the continuously heated type. Referring first to Fig. 7, there is provided a sealing bar 71 which is continuously heated to heat sealing temperatures by means of an electric heater cartridge 72 extending longitudinally therethrough. The top surface of bar 71 is covered by a layer 73 of heat-resistant insulation, such as Teflon-impregnated Fiberglas fabric, upon which is tensioned cutting wire 74, preferably directly above the longitudinal center line of layer 73.

The pressure bar comprises a metal base 75, having a relatively thick layer 76 of a suitable elastomer, such as silicone rubber thereon, which is covered with a thin layer 77 of heat resistant insulation, such as Teflon-impregnated Fiberglas. In view of the similarity of construction, the operation of this modified embodiment will be readily understood by those skilled in the art without any detailed description. It may be noted, however, that cutting wire 74 may be directly heated by the continuous or intermittent passage of an electric current therethrough, although in most cases no such heating is necessary in view of the heating effect of sealing bar 71.

The embodiment of the invention illustrated in Fig. 8, is practically identical with the one shown in Fig. 7 and similar reference numerals have been used to denote corresponding parts. The difference resides in the provision of cutting wire 74-a on the pressure bar, rather than on the sealing bar, which results in the advantages set forth more fully in the foregoing.

The machine and method of the invention are suitable for operation on practically all thermoplastic films, such as Pliofilm (rubber hydrochloride), Koroseal (a copolymer of vinyl chloride and vinyl acetate), Saran (vinylidene chloride), Polythene (polyethylene), etc.

Although the present invention has been disclosed in connection with a few preferred embodiments thereof, variations and modifications may be resorted to by those skilled in the art without departing from the principles of the invention. All of these variations and modifications are considered to be within the true spirit and scope of the present invention, as disclosed in the foregoing description and defined by the appended claims.

What is claimed is:

1. A heat sealing machine of the thermal impulse type comprising, in combination, a pressure bar, a sealing bar comprising a base having a metal sealing band tensioned thereon, means for reciprocating said bars to apply sealing pressure upon layers of thermoplastic film interposed therebetween, a cutting wire tensioned on one of said bars substantially above the longitudinal center line of said band, and switching means operable in timed relation with said reciprocating means for passing a pulse of electric current through said sealing band whereby said layers will be sealed together in a region of appreciable width by the heating effect of said band and the sealed region will be bisected by the pressure of said wire thereagainst in a single operation.

2. A heat sealing machine of the thermal impulse type comprising, in combination, a pressure bar; a sealing bar; said sealing bar comprising a base, a metal sealing band tensioned on said base, and a cutting wire tensioned substantially above the center line of said band and in direct contact therewith; means for reciprocating said bars to apply pressure upon thermoplastic films interposed therebetween; and switching means operable in timed relation with said reciprocating means for passing a pulse of electric current through said sealing band whereby said films will be sealed together in a region of appreciable width by the heating effect of said band and the sealed region will be bisected by the pressure of said wire thereagainst.

3. A heat sealing machine of the thermal impulse type comprising, in combination, a pressure bar; a sealing bar; said sealing bar comprising a base, a metal sealing band tensioned on said base, a layer of insulation of non-sticking characteristics covering said band, and a cutting wire having lesser diameter than the width of said band tensioned on said insulation with its axis substantially above the center line of said band; means for reciprocating said bars to apply pressure upon layers of thermoplastic film interposed therebetween; and switching means operable in timed relation with said reciprocating means for passing a pulse of electric current through said sealing band and through said cutting wire whereby said layers of film will be sealed together in a region of appreciable width by the heating effect of said band and the sealed region will be bisected by the mechanical and thermal effect of said wire thereon.

4. A heat sealing machine of the thermal impulse type comprising, in combination, a pressure bar; a sealing bar; said sealing bar comprising a base, an elongated metal heater element of appreciable width tensioned on said base, a thin layer of insulation covering said heater element, and an elongated metal cutting element of lesser width than that of said heater element tensioned on said insulation with its axis substantially above the center line of said heater element, said cutting element being electrically disconnected from said heater element; means for reciprocating said bars to apply pressure upon layers of thermoplastic film interposed therebetween; and switching means operable in timed relation with said reciprocating means for passing a pulse of electric current through said heater element whereby said layers of film will be sealed together in a region of appreciable width by the heating effect of said heater element and the sealed region will be bisected by the mechanical effect of said cutting element thereon while said region is still in a plastic condition.

5. A heat sealing machine of the thermal impulse type comprising, in combination, a pressure bar; a sealing bar; said sealing bar comprising a base, a heating and sealing band tensioned on said base, a thin layer of insulation covering said band, and a cutting wire having a diameter substantially less than the width of said band tensioned on said insulation with its axis substantially above the longitudinal center line of said band, said cutting wire being electrically disconnected from said band; means for reciprocating said bars to apply pressure upon layers of thermoplastic film interposed therebetween; and switching means operable in timed relation with said reciprocating means for passing a pulse of electric current through said band whereby said layers of film will be sealed together in a region of appreciable width by the heating effect of said band and the sealed region will be bisected by the mechanical effect of said wire thereon while said region is still in a plastic condition.

6. A heat sealing machine of the thermal impulse type comprising, in combination, a pressure bar; a sealing bar; said sealing bar comprising a base, a sealing band tensioned on said base, a thin layer of insulation covering said band, and a cutting wire having a diameter substantially less than the width of said band tensioned on said insulation with its axis substantially above the longitudinal center line of said band; means for reciprocating said bars to apply pressure upon layers of thermoplastic film interposed therebetween; first switching means operable in timed relation with said reciprocating means for passing a pulse of electric current through said band; second switching means operable in timed relation with said reciprocating means for passing a pulse of electric current through said wire; means for independently adjusting the timed relation of said first and second switching means; and means for independently determining the intensity of the pulses of current flowing through said band and said wire, respectively.

7. A heat sealing machine comprising, in combination, a pressure bar having a pressure-applying face and a cutting wire tensioned on said face, a sealing bar comprising a base with a metal sealing band tensioned thereon, means for reciprocating said bars to apply pressure upon thermoplastic films interposed therebetween, said cutting wire and sealing band being so mounted on the respective bars that the longitudinal axis of the wire substantially overlies the longitudinal center line of the band in the pressure-applying position of the bars, and switching means operable in timed relation with said reciprocating means for passing a pulse of electric current through said sealing band whereby said films will be sealed together in a region of appreciable width by the heating effect of said band and the sealed region will be bisected by the pressure of said wire thereagainst.

8. A heat sealing machine comprising, in combination, a pressure bar having a pressure-applying face, and a cutting wire tensioned on said face; a sealing bar; said sealing bar comprising a base, a metal sealing band tensioned on said base, and a layer of insulation of non-sticking characteristics covering said band; means for reciprocating said bars to apply pressure upon layers of thermoplastic film interposed therebetween; said wire having lesser diameter than the width of said band and said wire and band being so mounted on the respective bars that the longitudinal axis of the wire substantially overlies the longitudinal center line of the band in the pressure-applying position of the bars; and switching means operable in timed relation with said reciprocating means for passing a pulse of electric current through said sealing band and through said cutting wire whereby said layers of film will be sealed together in a region of appreciable width by the heating effect of said band and the sealed region will be bisected by the mechanical and thermal effect of said wire thereon.

9. A heat sealing machine of the thermal impulse type comprising, in combination, a pressure bar having a pressure-applying face, and a cutting wire tensioned on said face; a sealing bar; said sealing bar comprising a base, a sealing band tensioned on said base, and a thin layer of insulation covering said band; means for reciprocating said bars to apply pressure upon layers of thermoplastic film interposed therebetween; said wire having a smaller diameter than the width of said band and said wire and band being so mounted on the respective bars that the longitudinal axis of the wire is substantially above the longitudinal center line of the band in the pressure-applying position of the bars; first switching means operable in timed relation with said reciprocating means for passing a pulse of electric current through said band; second switching means operable in timed relation with said reciprocating means for passing a pulse of electric current through said wire; means for independently adjusting the timed relation of said first and second switching means; and means for independently determining the intensity of the pulses of current flowing through said band and said wire, respectively.

10. A sealing member for heat sealing machines comprising, in combination, a base, a metal sealing band through which sealing pulses of current may be passed tensioned on said base, a layer of insulation over said sealing band having such surface characteristics as to reduce sticking of sealed thermoplastic films thereto, and a cutting wire tensioned above said layer of insulation with its longitudinal axis substantially above the center line of said sealing band, the diameter of said wire being considerably less than the width of said band, said cutting wire being effective to sever the softened films of thermoplastic material heat sealed by said band when said sealing member is pressed against such films.

11. A sealing member for heat sealing machines comprising, in combination, a metal base, a metal sealing band through which sealing pulses of current may be passed tensioned on said base and electrically insulated therefrom, a thin layer of insulation over said sealing band, and a cutting wire of lesser diameter than the width of said band tensioned on said layer of insulation with its axis substantially above the center line of said sealing band, said cutting wire being adapted to be energized by pulses of an electric current and being effective to sever the softened layers of thermoplastic material heat sealed by said band when said sealing member is pressed against such layers.

12. A sealing member for heat sealing machines comprising, in combination, a base, a sealing band through which sealing pulses of current may be passed tensioned on said base, a thin layer of insulation having non-sticking characteristics over said sealing band, and a cutting wire of a diameter considerably smaller than the width of said band tensioned on said layer of insulation with its axis in parallelism and in substantial alignment with the center line of said sealing band, said wire being electrically disconnected from said band and adapted to act as a mechanical cutting member for severing the layers of thermoplastic film sealed together by the heating effect of said band while the sealed region is still in the plastic state.

13. The method of heat sealing and severing layers of thermoplastic film which comprises applying sealing heat and pressure to the layers in a region of appreciable width to cause heat sealing of the layers in such region, substantially simultaneously applying severing pressure to the center line of said region, thereby bisecting such region while it is still plastic, discontinuing the application of sealing heat, and continuing the application of pressure for a predetermined period thereafter to have the sealed and substantially severed portions of the layers cool and consolidate under pressure.

References Cited in the file of this patent

UNITED STATES PATENTS

| | | |
|---|---|---|
| 2,117,452 | Robinson et al. | May 17, 1938 |
| 2,289,618 | Young | July 14, 1942 |
| 2,460,460 | Langer | Feb. 1, 1949 |
| 2,556,452 | Spalding | June 12, 1951 |
| 2,574,094 | Fener et al. | Nov. 6, 1951 |
| 2,627,213 | Nye | Feb. 3, 1953 |
| 2,640,798 | Langer | June 2, 1953 |
| 2,721,925 | Langer | Oct. 25, 1955 |
| 2,726,706 | Hakomaki | Dec. 13, 1955 |